US008856205B2

(12) United States Patent
Tian (10) Patent No.: US 8,856,205 B2
(45) Date of Patent: Oct. 7, 2014

(54) EXTENSIBLE WEB SERVICES SYSTEM

(75) Inventor: Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1247 days.

(21) Appl. No.: 11/782,489

(22) Filed: Jul. 24, 2007

(65) Prior Publication Data

US 2009/0031313 A1 Jan. 29, 2009

(51) Int. Cl.
*G06F 9/46* (2006.01)

(52) U.S. Cl.
USPC ........... 709/203; 709/204; 709/205; 709/206; 718/102; 718/104; 718/105

(58) Field of Classification Search
USPC ............ 709/203; 718/102, 101; 717/170, 171
See application file for complete search history.

(56) References Cited

U.S. PATENT DOCUMENTS

| 7,404,188 | B2 * | 7/2008 | Luty et al. | 719/315 |
|---|---|---|---|---|
| 2004/0073705 | A1 * | 4/2004 | Madril et al. | 709/245 |
| 2005/0232262 | A1 * | 10/2005 | Toumura | 370/389 |
| 2005/0251501 | A1 * | 11/2005 | Phillips et al. | 707/2 |
| 2006/0123124 | A1 * | 6/2006 | Weisman et al. | 709/227 |
| 2007/0005642 | A1 | 1/2007 | Ghanaie-Sichanie et al. | |
| 2007/0073769 | A1 * | 3/2007 | Baikov et al. | 707/104.1 |

FOREIGN PATENT DOCUMENTS

| JP | 2000/092110 | 3/2000 |
|---|---|---|
| JP | 2006/163947 | 6/2006 |

OTHER PUBLICATIONS

"Sample Design Patterns for Consuming and Exposing Web Services from an Orchestratoion"—May 2007 Microsoft.*
"Coordinated Web Services Orchestration"—IEEE, 2007.*
European Communication in Application No. 08252532.0-2413 / 2023579 dated Mar. 17, 2011 (9 pages).
Ekanayake, J. et al., "Common Architecture for Functional Extensions on Top of Apache Axis 2," XP-002455230 dated Apr. 24, 2006 (8 pages).
"Axis2 Architecture Guide" The Apache Software Foundation, XP-002455231 dated Apr. 7, 2006 (12 pages).
"Soap Engine", Developer Connection, XP-002455232 dated Dec. 6, 2005 (4 pages).

* cited by examiner

*Primary Examiner* — Randy Scott
(74) *Attorney, Agent, or Firm* — Hickman Palermo Truong Becker Bingham Wong LLP; Daniel D. Ledesma (57) ABSTRACT

Techniques for extending a Web services system are provided. One or more Web service applications (WSA) execute on a device. Each WSA provides at least one service. A WSA implements a particular version of a Web Services (WS) specification that is previous to a current version of the WS specification. In one technique, an orchestration module is added that coordinates the interaction between the WSA and one or more extension modules. While processing the request, the WSA calls the orchestration module. The orchestration module, based on one or more attributes of a request, determines whether an extension module, that comprises logic, should be called to process a portion of the request. The logic corresponds to a difference between the previous version and the current version. After an extension module finishes processing the portion of the request, the WSA is caused to further process the request.

21 Claims, 5 Drawing Sheets

FIG. 1

| ORCHESTRATION MODULE 126 | | |
|---|---|---|
| KEY FIELD 202 | CONTEXT 204 | ACTION 206 |
| PRIORITY | SOAP HEADER | PRIORITY HANDLING MODULE, SERVICE MODULE |
| SCAN DESTINATION REGISTRATION | SOAP BODY | SCAN SERVICE, EVENTING SERVICE, SUBSCRIPTION MANAGEMENT, SCAN SERVICE |
| SUBSCRIPTION ID | SOAP HEADER | SUBSCRIPTION MANAGEMENT, EVENTING SERVICE |
| EXPIRATION TIME | SOAP HEADER | TIME MODULE, SERVICE MODULE |

EXTENSIBLE WEB SERVICES SYSTEM

CROSS-REFERENCE TO RELATED APPLICATIONS

This application is related to U.S. patent application Ser. No. 11/497,000, entitled ADVANCED WEB SERVICES ON A LEGACY PLATFORM, filed on Jul. 31, 2006, the contents of which are herein incorporated by this reference for all purposes as if fully disclosed herein.

This application is related to U.S. patent application Ser. No. 11/641,453, entitled WEB SERVICES DEVICE PROFILE ON A MULTI-SERVICE DEVICE: DYNAMIC ADDITION OF SERVICES, filed on Dec. 18, 2006, the contents of which are herein incorporated by this reference for all purposes as if fully disclosed herein.

This application is related to U.S. patent application Ser. No. 11/641,454, entitled WEB SERVICES DEVICE PROFILE ON A MULTI-SERVICE DEVICE: DEVICE AND FACILITY MANAGER, filed Dec. 18, 2006, the contents of which are herein incorporated by this reference for all purposes as if fully disclosed herein.

FIELD OF THE INVENTION

The present invention relates to Web Services, and more particularly to extending an already deployed Web Service application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The term "Web services" describes a standardized way of integrating Web-based applications using the XML, SOAP, and WSDL standards over a networking protocol, such as IP. XML is used to tag the data, SOAP specifies how to encode a Web service request and response into an XML message, and WSDL is used for describing the services available. Web services are used for programmatic and networked entities to communicate with each other, regardless of the platform for their implementation. Because many such entities are business-related, Web services allow businesses to communicate data without intimate knowledge of each other's IT systems behind a firewall.

Web services share business logic, data, and processes through a programmatic interface across a network. Web services allow different applications from different sources to communicate with each other without time-consuming custom coding. And, because all communication is in XML, Web services are not tied to any one operating system or programming language. For example, Java can talk with Python and Windows applications can talk with UNIX applications.

Web Services specifications compose together to provide interoperable protocols for security, reliable messaging, and transactions in loosely coupled systems. Web Services specifications include both approved standards (e.g. by the World Wide Web Consortium (W3C) and the Organization for the Advancement of Structured Information Standards (OASIS)) and proposed documents and drafts that may become standards.

Typically, Web service applications (WSAs) are tied to (or implement) one or more Web Services (WS) specifications. Therefore, WSAs do not recognize the information that is not defined in the specification, even though the corresponding fields are valid per schema.

WSAs need to be updated when the corresponding WS specifications are modified because some client applications may want to take advantage of the modifications. However, a device providing a WSA should remain compliant with older versions of the WS specifications in case client applications that request the service provided by the WSA have not yet been updated to reflect the modifications.

One approach for responding to a WS specification modification is to develop another WSA, which entails undergoing (again) the various phases of the software development process—design, coding, testing, documentation, and maintenance—which is typically quite costly. As a result of this approach and after a series of modifications to a WS specification, there may be multiple WSAs that (a) provide the same basic service and (b) execute simultaneously. Having multiple similar WSAs executing simultaneously requires additional memory and processing power.

In a similar approach, a new WSA is developed that takes into account an old version and the new version of the WS specification. However, as a result of this approach, the old WSA must be taken down before the new WSA is brought up. Thus, the services provided by the WSA may be temporarily unavailable.

SUMMARY

Techniques for extending Web services system are provided. According to one technique, a Web service application (WSA) receives a request. The WSA may implement a version of a Web Services (WS) specification that is previous to a current version of the WS specification. An orchestration module, which coordinates interactions between the WSA and one or more extension modules, is called to process the request. Based on one or more attributes of the request, the orchestration module identifies an extension module to process a portion of the request. The extension module comprises logic that corresponds to a difference between the previous version of the Web Services specification and the current version. The orchestration module causes the extension module to process the portion of the request. After the extension module finishes processing the portion of the request according to its logic, the WSA is called to further process the request.

According to another technique, a WSA comprises multiple modules, at least two of which may not be designed to interact with each other. Initially, a first module of the multiple modules processes the request. An orchestration module is caused to execute. Based on one or more attributes of the request, the orchestration module identifies a second module of the multiple modules to process a portion of the request. The orchestration module causes the second module to process the portion of the request. After the second module finishes processing the portion of the request, the orchestration module causes the first module to continue processing the request. In this case, the one or more (indirect) interactions between the first module and the second module constitute the difference between the previous version and the current version.

According to another technique, a WSA receives a request for a service provided by the WSA. The WSA implements a particular version, of a WS specification, which may be previous to a current version of the WS specification. The request specifies a field that is not supported by the particular version. Based on a mapping, the field value is translated into data that a firmware component of the device is able to process. The firmware component processes the request based on the data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
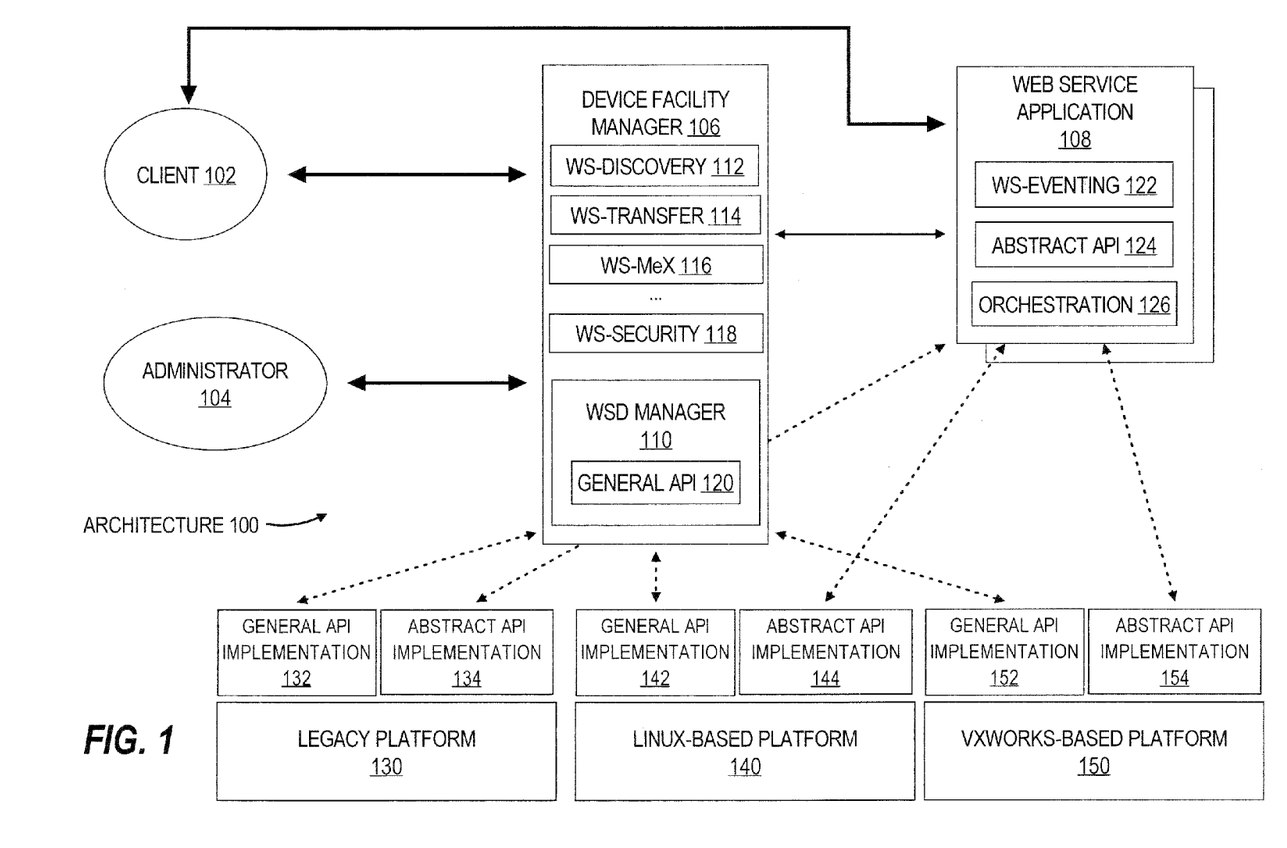
FIG. 1 is a block diagram that illustrates an example architecture 100 for processing SOAP requests, according to an embodiment of the invention.

The description herein is provided in sections organized as follows:
1.0 Architectural Overview
  1.1 Client
  1.2 Network
  1.3 Device Facility Manager
  1.4 WSD Manager
    1.4.1 General API
    1.4.2 General API Implementation
  1.5 Web Service Application
    1.5.1 Abstract API
    1.5.2 Abstract API Implementation
2.0 General Overview
3.0 Orchestration Module
4.0 Extending a Web Service Application With an Extension Module
5.0 Extending a Web Service Application By Connecting Previously Unrelated Modules
6.0 Handling Differences Between a Web Service Application and the Capabilities of a Device
7.0 Composing Web Service Application Logic That is Decoupled From a Web Services Specification
8.0 Implementation Mechanisms 1.0 Architectural Overview FIG. 1 is a block diagram that illustrates an example architecture 100 for processing SOAP requests, according to an embodiment of the invention. Architecture 100 includes a client 102, an administrator 104, a Device Facility Manager (DFM) 106, and a plurality of Web service applications (WSAs) 108 executing on a MFP.

The MFP, as indicated by FIG. 1, may comprise any number of different platforms (e.g. a legacy platform 130, a Linux-based platform 140, and a VxWorks-based platform 150), and normally a MFP comprises only one platform. If an MFP includes a print service, then that platform should include a print engine. Similarly, if the MFP includes a scan service, then at least one platform includes a scan engine.

DFM 106 represents the MFP by responding to discovery requests, metadata requests from client 102, and configuration and other MFP administration requests from an administrator 104. DFM 106 may act as a repository of implementations of multiple Web Service specifications, such as WS-Discovery 112 and WS-MeX (i.e. WS-MetadataExchange) 116.

Each WSA 108 executing on the MFP provides a service to client 102 that requests the service, e.g. using the SOAP protocol. Each WSA 108 may employ a service specific abstract API, such as abstract API 124, independent from the target platform. Additionally, each WSA 108 may implement WS-Eventing 122.

Client 102 may discover that an MFP exists via a discovery request or a discovery HELLO message (i.e., a broadcast or multicast message announcing the MFP to devices on the same network). Once client 102 is aware of the existence of an MFP, client 102 sends a device metadata exchange request, e.g. via WS-MetadataExchange, to discover all the services that the MFP provides. DFM 106, acting for the entire device, receives the request and returns metadata describing the various services provided by the MFP. Client 102 may request service metadata from a particular WSA executing on the MFP, such as WSA 108. WSA 108 may request the service metadata from a Web Service Device (WSD) Manager 110, which returns the service metadata to WSA 108. WSA 108 forwards the service metadata to client 102.

Alternatively, the device metadata of the MFP and the service metadata of one or more WSAs may be sent to client 102 in the same response.

Based on the service metadata, client 102 generates and transmits a SOAP request corresponding to a service provided by WSA 108 which WSA 108 receives and processes. Based on a service request, WSA 108 may use an abstract API 124 to make a platform-specific call to an implementation of abstract API 124, such as an abstract API implementation 144. In this way, a developer of a WSA (e.g. WSA 108) may focus on the development of the Web service itself without having to know the complexities of the underlying platform upon which the Web service executes. Therefore, someone other than the WSA developer with knowledge of the target platform may define the implementation of the corresponding abstract API.

1.1 Client

Client 102 is an application that is associated with a process that requests one or more services provided by an MFP. Client 102 is typically an application associated with the operating system that supports the initial requesting process. A purpose of client 102 is to convert a platform-specific procedure call, from a requesting process, to a SOAP request that can be processed by an application that "understands" SOAP.

For example, the requesting process may be associated with a Microsoft Word application and WSA 108 may provide a print service. Client 102 may then be an application associated with the operating system that supports the initial requesting process. Client 102 receives a platform-specific "print data" request sent from the requesting process. Client 102 encodes the print data request in a SOAP message that can be processed by WSA 108 that "understands" SOAP messages.

1.2 Network

SOAP communication between client 102 and an MFP may be made over a network (not shown). The network may be implemented by any medium or mechanism that provides for the exchange of data between various nodes in the network. Examples of such a network include, without limitation, a network such as a Local Area Network (LAN), Wide Area Network (WAN), Ethernet or the Internet, or one or more terrestrial, satellite, or wireless links. The network may include a combination of networks such as those described. The network may transmit data according to Transmission Control Protocol (TCP), User Datagram Protocol (UDP), and/or Internet Protocol (IP).

1.3 Device Facility Manager

DFM 106 represents an MFP by accepting discovery requests, requests for logging information, and configuration instructions. According to an embodiment, DFM 106 also acts as a repository of implementations of multiple Web Services (WS) specifications. Thus, DFM 106 includes a shared library of routines that each implement one or more functions defined by one or more WS specifications (e.g. WS-Security, WS-MetadataExchange). In this way, multiple WS specifications may be implemented once and then shared with each of the multiple Web service applications (i.e. WSA 108) executing on the MFP. As a result, developers of WSAs are not required to know many details about any of the specifications implemented on DFM 106 but can use and rely on the specifications. Some WS specifications implemented on DFM 106 may include, but are not limited to, WS-Discovery 112, WS-Transfer 114, WS-MeX (i.e. WS-MetadataExchange) 116, and WS-Security 118.

In one embodiment, DFM 106 includes library routines corresponding to the SOAP protocol. Each SOAP library routine implements one or more functions defined by one or more SOAP specifications. The SOAP library routines are used to analyze SOAP requests and package SOAP messages. Therefore, each WSA 108 may invoke one or more SOAP library routines from DFM 106 so that the SOAP library routines may be defined once and shared among all WSAs 108 executing on the MFP. Multiple versions of the SOAP protocol standard may be supported. Updates to a newer version of a SOAP protocol standard may be done with little or no modification to WSA 108.

In one embodiment, a client application (e.g. client 102) may register to receive information pertaining to updates to one or more WSAs on the MFP. If DFM 106 receives update information pertaining to an update of a particular application and a client application is registered to receive a message indicating such update, then DFM 106 sends to the client application a message that indicates the update information. In a related embodiment, client 102 is not required to register (e.g., subscribe) to receive such update notifications. Rather, DFM 106 may be configured to automatically broadcast a message indicating an update to one or more of the WSAs.

In one embodiment, DFM 106 may receive update information pertaining to a WSA. For example, WSA 108 may provide a fax service and the MFP detects that the fax line is disconnected. DFM 106 should not respond to future metadata requests with device metadata that indicates that the MFP provides a fax service when the fax service is unavailable. Therefore, DFM 106, in response to receiving update information from a WSA, updates the device and/or service metadata associated with the WSA.

In one embodiment, DFM 106 may receive configuration requests from an administrator application (e.g. administrator 104). A configuration request indicates one or more WSAs that are to be configured and/or updated. The DFM 106 handles configuration requests and performs, or causes to be performed, the configuration or update instruction on the appropriate WSA. Alternatively, as described in more detail below, DFM 106 may instruct WSD Manager 110 to handle such configuration requests.

In one embodiment, DFM 106 may receive and respond to log requests from an administrator application (e.g. administrator 104). DFM 106 retrieves logging information pertaining to the one or more WSAs executing on the MFP and sends the logging information to administrator 104. As described in more detail below, WSD Manager 110 may retrieve and provide to DFM 106 the logging information.

1.4 WSD Manager

According to an embodiment, DFM 106 also comprises WSD Manager 110. WSD Manager 110 provides a central point for logging information, status inquiry, and external management of the MFP, such as from an administrator 104. Administrator 104 is an application that is configured to retrieve information pertaining to the MFP through WSD Manager 110. For example, WSD Manager 110 may centralize all logging information coming internally from all WSAs 108 and from the various platforms upon which WSAs 108 are executing. An administrator may also configure, update, or disable a WSA 108 using WSD Manager 110.

In one embodiment, WSD Manager 110 maintains overall status information, such as where the MFP is located, what WSAs are installed on the MFP, and whether the WSAs are running properly.

In one embodiment, WSD Manager 110 maintains the metadata for the MFP and service metadata pertaining to each service application running on the MFP.

1.4.1 General API

According to an embodiment, WSD Manager 110 retrieves general information pertaining to the MFP, such as the IP address and the model number of the MFP, through general API 120. General API 120 defines an interface by which DFM 106 receives information specific to each platform of the MFP. In this way, a DFM developer is not required to know the details of a specific platform, only the details of the DFM that the developer is building for an MFP. (The dotted lines in FIG. 1 are API calls from a particular API to the corresponding API implementation.)

1.4.2 General API Implementation

If general API 120 has been defined for DFM 106, then an implementation of general API 120 for a specific platform is defined. For example, a general API implementation 132 is defined for general API 120 on a legacy platform 130. Similarly, a general API implementation 142 is defined for general API 120 on a Linux-based platform 140. A corresponding general API implementation defines the functions specified in a device-specific request and implemented on the MFP.

1.5 Web Service Application

Web service application (WSA) 108 comprises one or more modules. WSA 108 provides one or more Web services and relies on Web Services (WS) protocols and technologies, such as those protocols provided by DFM 106. The one or more modules may be implemented in hardware circuitry, in computer software, or a combination of hardware circuitry and computer software, and is not limited to a particular hardware or software implementation. WSA 108 may also rely on a separate SOAP module (not shown) to analyze SOAP requests if WSA 108 does not include logic for analyzing SOAP requests. As indicated above, the separate SOAP module may be provided by DFM 106 and shared among all WSAs 108.

WSA 108 may also comprise a WS-Eventing module 122 for responding to event requests from client 102. Client 102 may subscribe to an event associated with the service provided by WSA 108. For example, WSA 108 may provide a print service and an event that client 102 subscribes to is when the MFP associated with WSA 108 completes a print job. Thus, upon completion of the print job, WSA 108 will send an event message to client 102 indicating that the print job is completed.

A WSA is developed and implemented based on one or more WS specifications in order to provide one or more services. One WS specification may exist for a scan service, another WS specification for a print service, another WS specification for an archive service, and another WS specification for a fax service.

As used hereinafter, an older version of a WS specification that a WSA is based on is referred to as the "old version" while the current version of the WS specification is referred to as the "new version."

As a result of processing requests, a WSA performs one or more actions, such as printing an electronic document or sending a response to an event subscription request. The requests may come from clients (e.g., a client 102), in which case the requests may be SOAP requests, or from a user that interfaces with a touch panel display of the MFP.

1.5.1 Abstract API

WSA 108 may also comprise an abstract API (e.g. abstract API 124) through which platform-specific calls are generated. The abstract API defines an interface by which the associated WSA 108 invokes one or more functions on the MFP.

1.5.2 Abstract API Implementation

If an abstract API has been defined by a Web service application developer, then an implementation of the abstract API for a specific platform is defined. For example, an abstract API implementation 154 is defined for abstract API 124 on VxWorks platform 150. A corresponding abstract API implementation defines the functions specified in a platform-specific request and implemented on the MFP.

2.0 General Overview

Techniques are provided for extending a Web services system. For example, a WSA may implement a version of a WS specification that is previous to a current version. In order to support requests that conform to the current version and not a previous version or that reference features of the current version that are not in the previous version, the WSA must be extended, and preferably without modifying the basic logic of the WSA.

To indicate to clients that a Web services system is current, a WSDL file that describes the services provided by a WSA may be updated to reflect a current version of a WS specification or to reflect the capabilities of the device upon which the WSA executes. When a client requests the WSDL file, the client "knows" what features the WSA supports. One benefit that is achieved by various embodiments of the invention is that an existing WSA may be re-used without down-time or affecting user experience.

3.0 Orchestration Module

According to an embodiment of the invention, an orchestration module is generated for one or more of the WSAs executing on an MFP. An orchestration module is responsible for extending a WSA without modifying the basic logic of the WSA. An orchestration module may be rule-based or may be designed following object-orientated hierarchy. An orchestration module controls the interactions among various modules, such as a printing service module, an eventing service module, a scanning service module, and an archiving service module. An orchestration module provides flexibility that simply chaining extension modules cannot achieve. For example, the rule entries indicated in an orchestration module are configurable. Thus, actions may be modified at runtime to coordinate extension modules and multiple modules. Also, new rules may be added at runtime.

As FIG. 1 illustrates, each WSA 108 comprises an orchestration module 126. However, in another embodiment, if a device comprises multiple WSAs, then orchestration module 126 may be shared among the multiple WSAs, in which case orchestration module 126 may logically reside in DFM 106.

Figure 2:
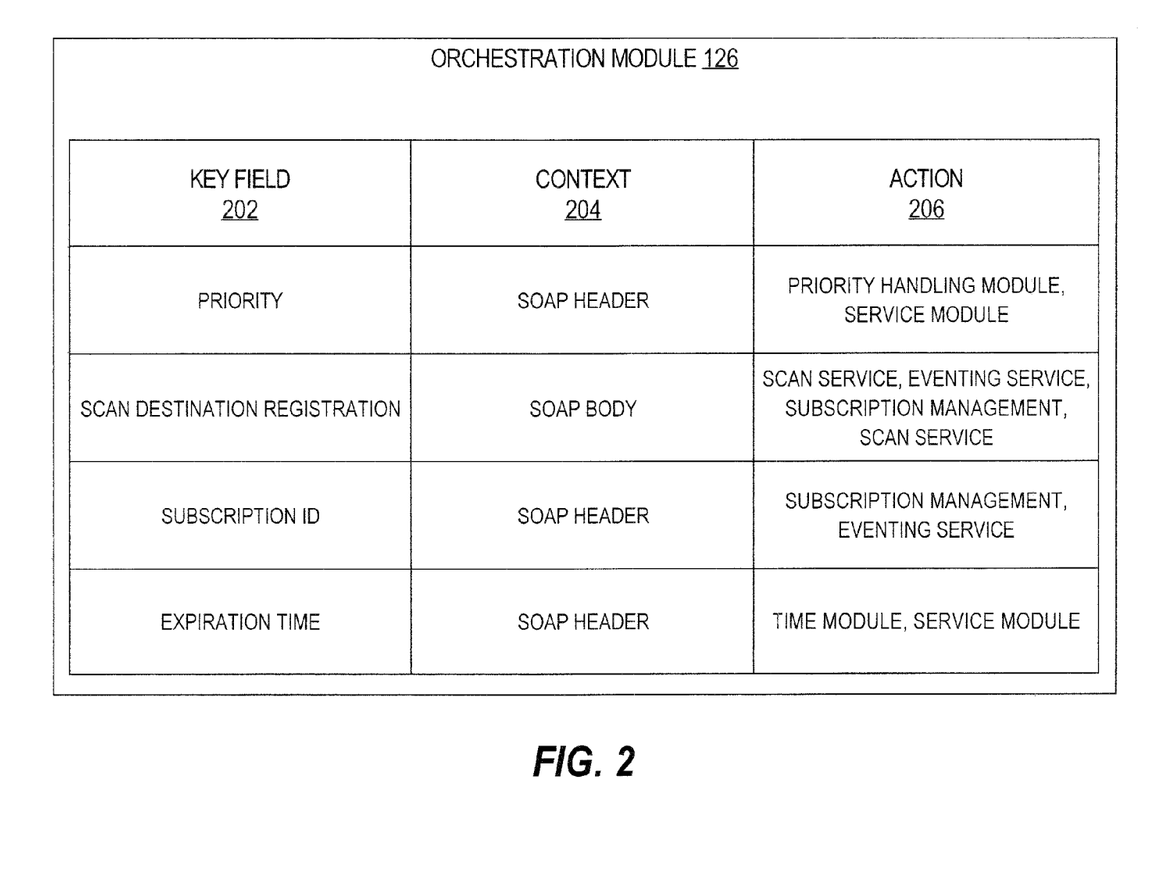
FIG. 2 is a block diagram that illustrates an example orchestration module for processing requests, according to an embodiment of the invention.

FIG. 2 is a block diagram that illustrates an example orchestration module 126 for processing requests, according to an embodiment of the invention. Orchestration module 126 includes a table, which comprises three columns: a key field column 202, a context column 204, and an action column 206. Thus, the table of orchestration module 126 comprises a set of 3-tuples, four of which are illustrated. Accordingly, each 3-tuple comprises a key field value, a context value, and an action value. However, in other embodiments, the table may instead comprise two columns or four or more columns. For example, the table may comprise only key field column 202 and action column 206.

For each row in the table of orchestration module 126, key field column 202 indicates one or more fields in a request that may trigger the execution of one or more modules indicated in the corresponding action column 206.

Context column 204 indicates one or more contexts in which the corresponding key fields must be at least logically located in order for the corresponding one or more modules to be executed. A "context" indicates a logical location of a corresponding field within a request. Thus, if orchestration module 126 includes context column 204, then one or more modules identified in action column 206 are executed only if the corresponding key field(s) are located within the proper context of the request. Accordingly, one key field in one context may trigger one set of actions, whereas the same key field in a different context may trigger a different set of actions.

In a related embodiment, key field column 202 or context column 204 indicates a namespace associated with the corresponding field. For example, the namespace may be "Ricoh" indicating that the Ricoh schema is used to define the priority field.

As FIG. 2 illustrates, the first 3-tuple includes key field 202 value "priority," context 204 value "SOAP header," and action 206 value "priority handling module, service module." The reference to "service module" refers to the WSA that implements a particular MFP service 212, such as printing, scanning, faxing, copying or archiving. When a SOAP request is passed to orchestration module 126 and orchestration module 126 determines that the request includes a "priority" field in the header portion of the SOAP request, then a priority handling module is called. Once the priority handling module finishes processing the request, execution passes back to orchestration module 126, which then calls the appropriate service module to continue processing.

The last 3-tuple includes key field 202 value "expiration time," context 204 value "SOAP header," and action 206 value "time module, service module." According to this 3-tuple, when a SOAP request is passed to orchestration module 126 and orchestration module 126 determines that the request includes an "expiration time" field in the header portion of the SOAP request, then a time module is called. If the time module returns a fault, then orchestration module 126 will not call a service module for further processing. Otherwise, after the time module finishes processing the request, orchestration module 126 will call the appropriate service module to process the request.

4.0 Extending a Web Service Application with an Extension Module

In an embodiment, an orchestration module manages the interaction between the WSA and an extension module that implements the features of a new version of a WS specification that are not in an old version of the WS specification. With the goal of not modifying or affecting a currently running WSA, the orchestration module coordinates the interaction between the deployed WSA and one or more plug-in extension modules. In order to correctly handle new features, such as a 'priority' field in a SOAP request, chained processing channels (i.e., handles) are added at certain locations in the WSA processing logic.

Figure 3:
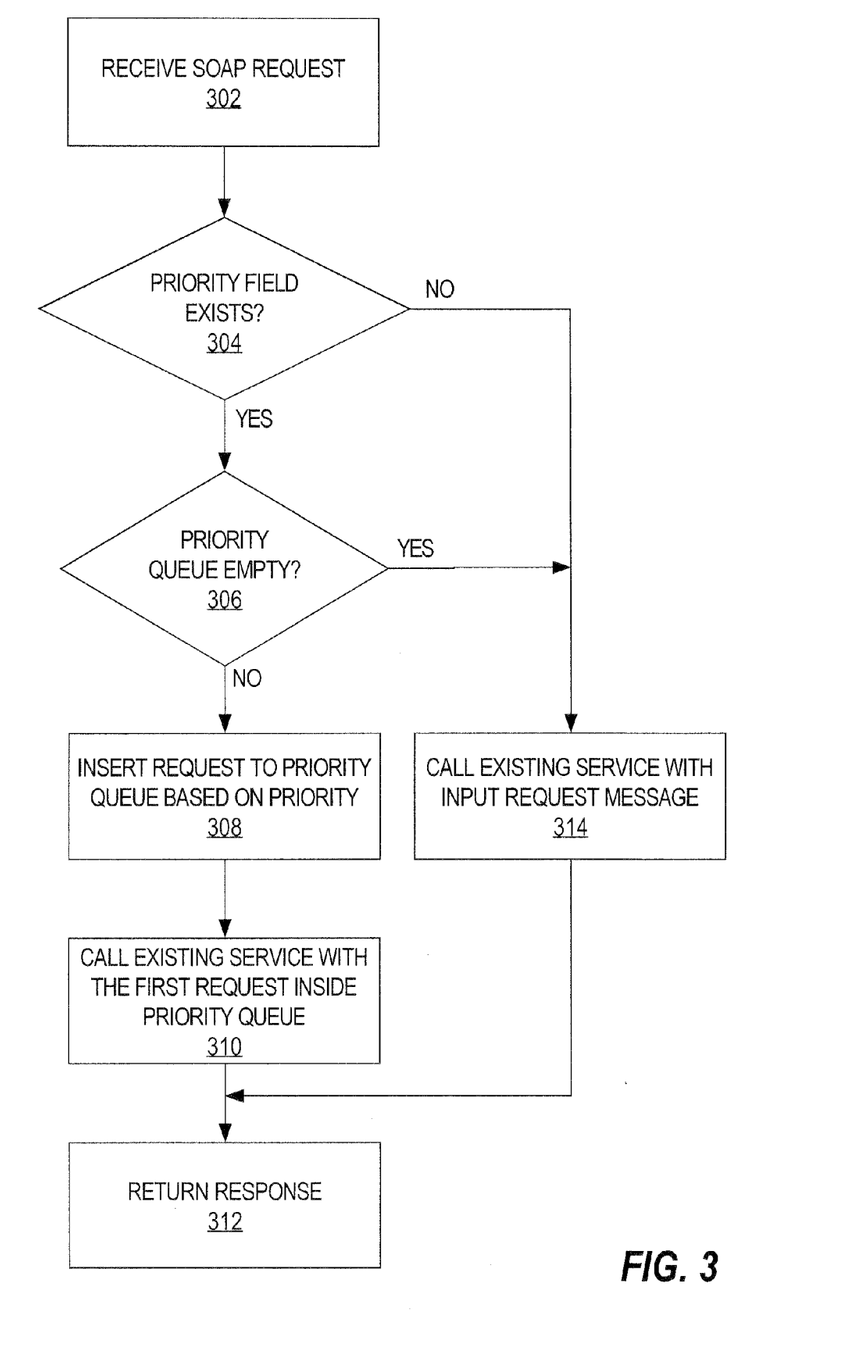
FIG. 3 is a flow diagram that illustrates a processing of an "unexpected" 'priority' field in a request, according to an embodiment of the invention.

FIG. 3 is a flow diagram that illustrates how an orchestration module may be used in processing a 'priority' field, in a SOAP request, that is not recognizable by a WSA, according to an embodiment of the invention. In the present example, the WSA processes requests FIFO (first come first out) according to the WS specification upon which the WSA is based. The specification is silent about how to handle requests that include a priority field; thus, the WSA does not include logic for processing requests that include the priority field. Therefore, if the WSA encounters a request with a priority field, then the WSA simply ignores the priority field.

In order to handle requests that contain a priority field and process requests based on the specified priority, an extension module (referred to as a "priority handling module" in this case) is added at the device.

Referring again to FIG. 3, at step 302, a request is received, from a client, at the WSA. At step 304, an orchestration module associated with the WSA is called to process the request. The message may be parsed by the WSA or the orchestration module, whereas field matching is executed by the orchestration module. Thus, the orchestration module determines whether a priority field is included in the request. If a priority field is not found in the request, then the process proceeds to step 314, where the WSA processes the request (i.e., FIFO). If the orchestration module determines that a priority field is included in the request, then the process proceeds to step 306.

In one embodiment, at step 304, the orchestration module further determines whether the priority field exists in the proper context (e.g., according to orchestration module 126 of FIG. 2). For example, if the request is a SOAP request and the priority field is included in the body portion of the SOAP request and not in the header portion of the SOAP request, then the priority field is ignored by the orchestration module and the process proceeds to step 314. However, if the context of the priority field is correct, i.e., the priority field is included in the header portion of the SOAP request, then the orchestration module causes the priority handling module to process the priority field of the SOAP request and the process proceeds to step 306.

At step 306, the priority handling module determines whether a request processing queue, that the WSA maintains, is empty. If so, then the process proceeds to step 314 indicating that priority-based queuing is unnecessary.

If the request processing queue is not empty, then, at step 308, the priority handling module maintains, e.g., a linked list to arrange requests based on their 'priority' field value, and waits until the request processing queue of the WSA becomes empty.

At step 310, the WSA is called to process the request at the head of the linked list. At step 312, after the WSA finishes processing the request, a response is sent to the client that sent the request.

Thus, only the priority handling module is aware of the business logic for the priority field. The WSA is not modified and remains up and running even when the priority handling module is plugged into the WSA.

5.0 Extending a Web Service Application By Connecting Previously Unrelated Modules In an embodiment, an orchestration module manages the interaction between various modules executing on a MFP wherein the interaction itself constitutes one or more features of a new version of a WS specification that are not in a previous version. For example, a MFP includes a scan service and an eventing service, which have been developed independently and deployed without any interaction with each other. Subsequently, a new version of a WS specification for the scan service (or service provider) indicates that scan destination registration information may be embedded in an event subscription request message. Instead of modifying the eventing service or the scan service, an entry is added to an orchestration module to route the processing of an event subscription request accordingly.

Figure 4:
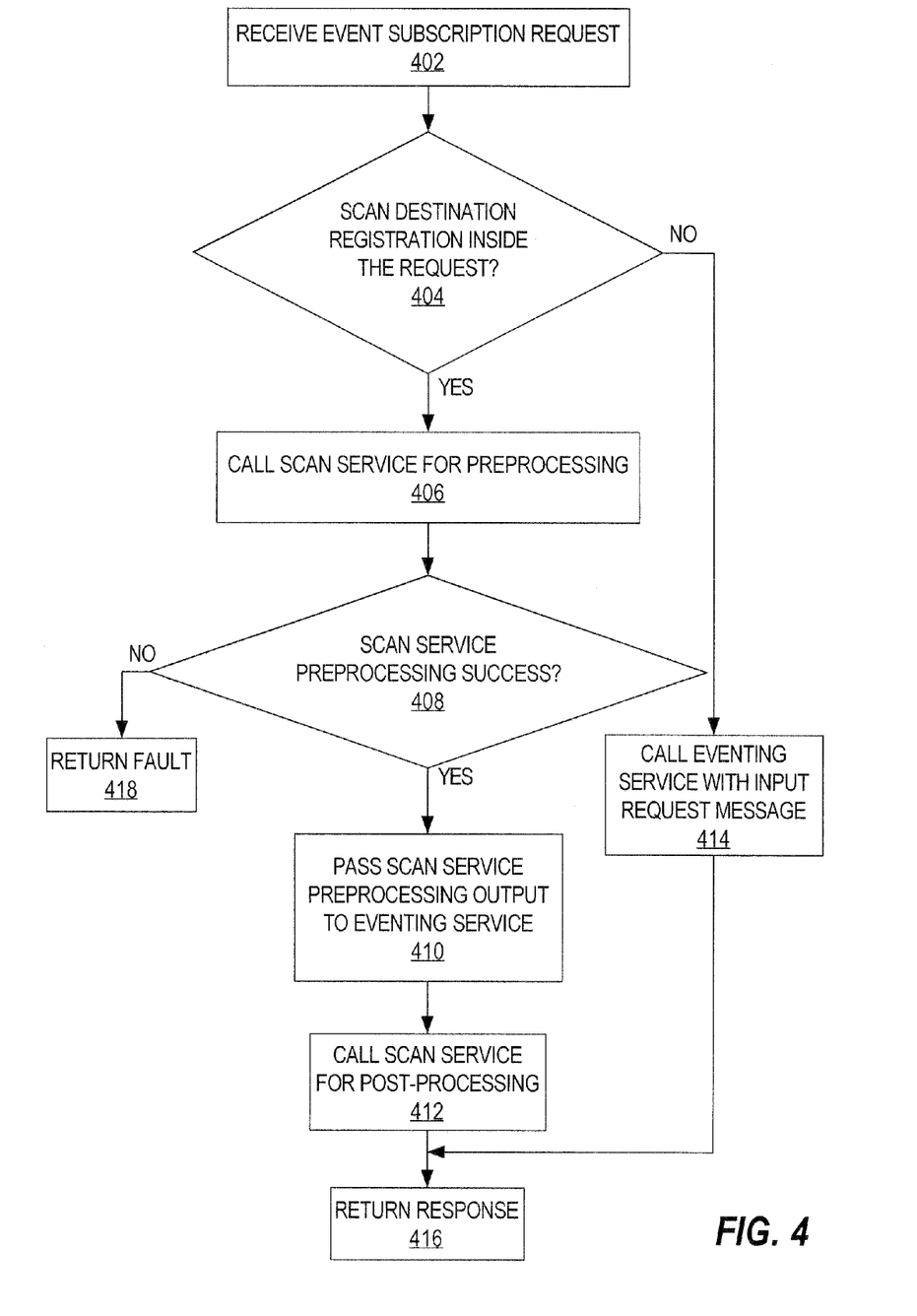
FIG. 4 is a flow diagram of processing an embedded scan destination registration in an event subscription request, according to an embodiment of the invention.

FIG. 4 is a flow diagram of processing an embedded scan destination registration in an event subscription request, according to an embodiment of the invention. At step 402, an eventing service, executing as one or more modules, receives an event subscription request from a client. The eventing service then calls an orchestration module (e.g., orchestration module 126). As part of step 402, the eventing service may determine whether the event subscription request is formatted properly (e.g., according to a WS-Eventing specification). If not, then the eventing service may send a fault message to the client.

In an alternative embodiment, the orchestration module sits in front of all the modules of the WSA, including the eventing service. In that case, the orchestration module receives the request from the client and determines which module to call.

At step 404, the orchestration module determines whether the event subscription request includes a scan destination registration (e.g., in the proper context, such as illustrated in FIG. 2). If not, then the processing proceeds to step 414 where the orchestration module calls the eventing service to process the request according to its existing logic. However, if the orchestration module determines that the event subscription request includes a scan destination registration, then the process proceeds to step 406.

At step 406, the orchestration module calls the scan service to preprocess the scan destination registration information. Preprocessing may involve many steps, such as validating the scan destination display name and whether a maximum destination registration number has been reached. The maximum destination registration number is pre-defined at the device side. As another example of preprocessing, the scan service creates a destination token to recognize the scan destination registration request, which token is later used for job creation. The scan service passes the destination token to the eventing service as part of a subscribe response. The destination token is later used, together with other fields from the scan destination related event, as handshaking information between the client and the scan service for job creation. The scan destination related event is generated by the scan service when a specific scan destination is selected from, e.g., the scanner operational panel.

At step 408, the scan service determines whether the scan service preprocessing was successful. If not, then a fault is returned to the client (at step 418). An example of unsuccessful preprocessing occurs when a number of destinations specified in the event subscription request exceeds the maximum destination registration number. As another example of unsuccessful preprocessing, the scan service does not recognize the scan destination registration information.

If the scan service preprocessing is successful, then the process proceeds to step 410. At step 410, the scan service passes any output from preprocessing to the orchestration module, which passes such information to the eventing service for subscription management processing. However, as illustrated in FIG. 2, a subscription management module may be separate from the eventing service. In that case, the orchestration module will pass the output of the scan service's preprocessing to the eventing service for subscription creation. Subsequently, the eventing service will forward the created subscription information to the subscription management module for subscription management processing.

After the eventing service (or subscription management module) finishes the subscription management processing, the orchestration module calls the scan service for post-processing (step 412), such as scan destination management. For example, the scan service may add and save the destinations specified in the subscription request to a destination list (e.g., using a destination manager) in local memory for future use.

One reason for the post-processing of step 412 is that the scan service may need to make use of the data created by the eventing service when the eventing service composes a subscribe response to the event subscription request. For example, the scan service may need to keep track of a subscription identifier that the eventing service generates to uniquely identify the accepted subscription. Therefore, post-processing should not be combined with preprocessing.

Another reason for the post-processing of step 412 is to avoid an unnecessary processing step. During or before the preprocessing of step 406, the eventing service may validate the event subscription request (e.g., based on a WS-Eventing specification). If the eventing service determines that the event subscription request is invalid before the composition of a subscription response message, then the eventing service will compose a fault message and send the fault message to the client. The orchestration module is notified of the error and will stop the chained processing; that is, neither the subscription management module nor the scan service will be called. The eventing service should not notify the scan service about the error because such services should be transparent with respect to each other. Such services only interact with the help of the orchestration module.

The separation of pre- and post-processing from the processing of an event subscription request is to maximize flexibility and extensibility while maintaining the modularity of the eventing service and the scan service. In this way, neither the eventing service nor the scan service is required to understand each other's data schema or business logic.

After the post-processing of step 412, the eventing service generates an event subscription response, which is sent to the client (step 416). If the orchestration module sits on top of all the services, and receives the request message, then the orchestration module will send back the response after the post-processing of the scan service. If the eventing service receives the client request and calls orchestration module afterwards for possible further processing, then the eventing service will send back the subscribe response to client.

In this way, request messages may be handled by a combination of services in a designated way, without modifying any existing services.

6.0 Handling Differences Between a Web Service Application and the Capabilities of a Device In another embodiment, differences between a WSA and the features provided by the device upon which the WSA executes are handled. A WSA is designed to allow relatively easy workflow or business logic customization. A request, from a client, may include a field (and field value) that is not defined by a WS specification that the WSA is based on. The field value, however, may be recognizable by a firmware component of the device.

For example, as illustrated in FIG. 1, WSA 108 may comprise abstract 124 API through which platform specific calls are generated. Abstract layer 124 defines an interface by which WSA 108 interacts with underlying platform to provide a (e.g., printing) service. Thus, abstract API implementation 144 is defined for abstract API 124 on Linux-based platform 140, and abstract API implementation 154 is defined for abstract API 124 on VxWorks platform 150.

In order to ensure that all portions of a client request (that a device is capable of processing) are processed appropriately, a WSA provides a hook to pass unrecognizable portions of the request to the appropriate abstract API implementation. A mapping table associates values that are specified in a request (which values are not mentioned in a specification upon which the WSA is based) with values that an abstract layer recognizes. That mapping table may reside in an orchestration module or elsewhere. For example, if the abstract layer is a built-in component of a WSA, then the WSA uses the mapping table to convert a client-requested value to a value recognized by the abstract layer. As another example, the abstract layer may be a separate module from the WSA and an orchestration module matches the values from the mapping table. If additional features are added to an abstract API implementation, then only the mapping may need to be updated. In this way, the WSA is not required to be updated.

For example, a version of a scan service specification (whether old or current) does not define page opening orientation for a 2-sided original. However, the scanning device supports "Top To Top" and "Top To Bottom" page opening orientations for a 2-sided original. In this example, a WSA is based on a particular version of a scan service specification. The WSA receives a request that includes a field that indicates page opening orientation for a 2-sided original with an associated value of "Top To Top." A mapping table is consulted (e.g., by the WSA) to translate "Top To Top" to data that the scanning engine (of the scanning device) can process. The data may be, for example, "T2T." The firmware component of the device is able to process "T2T" by scanning one or more documents according to the "Top To Top" page opening orientation for a 2-sided original document. Later, if a new version of the scan service specification adds support for page opening orientation, then the WSA, which is based on an old version of the specification, does not need to be modified.

7.0 Composing Web Service Application Logic that is Decoupled from a Web Services Specification According to an embodiment of the invention, the logic of a WSA is originally composed to decouple the core business logic of a WS specification from version-specification information of the WS specification. Thus, the WSA contains core business logic while version-specific constraints and/or data schema validation are enforced by one or more extension modules. Thus, the WSA may be re-used without modifying the underlying code of the WSA.

Core business logic (CBL) of a WS specification deals with operations related to the device itself. CBL does not validate a request from the syntax point of view; instead CBL determines whether a request can be accepted and processed based on the functionality of the underlying device.

Example CBL for a printer includes creating a print job, printing a document, and retrieving printer metadata, capability, default print ticket, printer status, active print jobs, job history, as well as generating print job status events and/or other printer related events. Example CBL for a scanner includes creating scan job, scanning a document, sending an image back to client/scan destination, generating scan job status events and/or other scanner related events, and retrieving scanner metadata, capability, default scan ticket, scanner status, active scan jobs, and scan job history.

Version-specific constraints (VSC) of a WS specification are syntax constraints imposed by each version of a specification regarding the composition of a request message and a response message. A VSC does not deal with the functionality of the device. An example of a VSC is a WS-Addressing action field in the SOAP header of a request and response message. Each version of a service (e.g., printing service or scanning service) specification may define a different WS-Addressing action field in the SOAP header of each operation's request and response message. Another example of a VSC is that the scan document format may be optional in one version of the specification but may be required in another version of specification. Such VSCs may be handled and enforced by one or more extension modules, aside from WSA, to better accommodate possible specification changes.

A data schema validation module is a module that determines whether the fields specified in a request are valid based on one or more data schemas. For example, a data schema validation module may determine whether a SOAP request is formatted properly and, if not, the SOAP request may be dropped and an error message sent to the client. As another example, a data schema validation module associated with a print service may determine whether fields specified in a request are valid based on a printing specification. Some invalid fields may be ignored (i.e., the WSA may continue to process the request), whereas other invalid fields may not be ignored (e.g., the WSA returns an error message to the client).

In one embodiment, core business logic of a WS specification is implemented as multiple executables. In a related embodiment, the core business logic of a WS specification is implemented as a single executable that invokes multiple (static or dynamic) library routines. The advantage of library routines is that inter-process communication is avoided, which inter-process communication tends to be slower than invoking library routines.

8.0 Implementation Mechanisms

Figure 5:
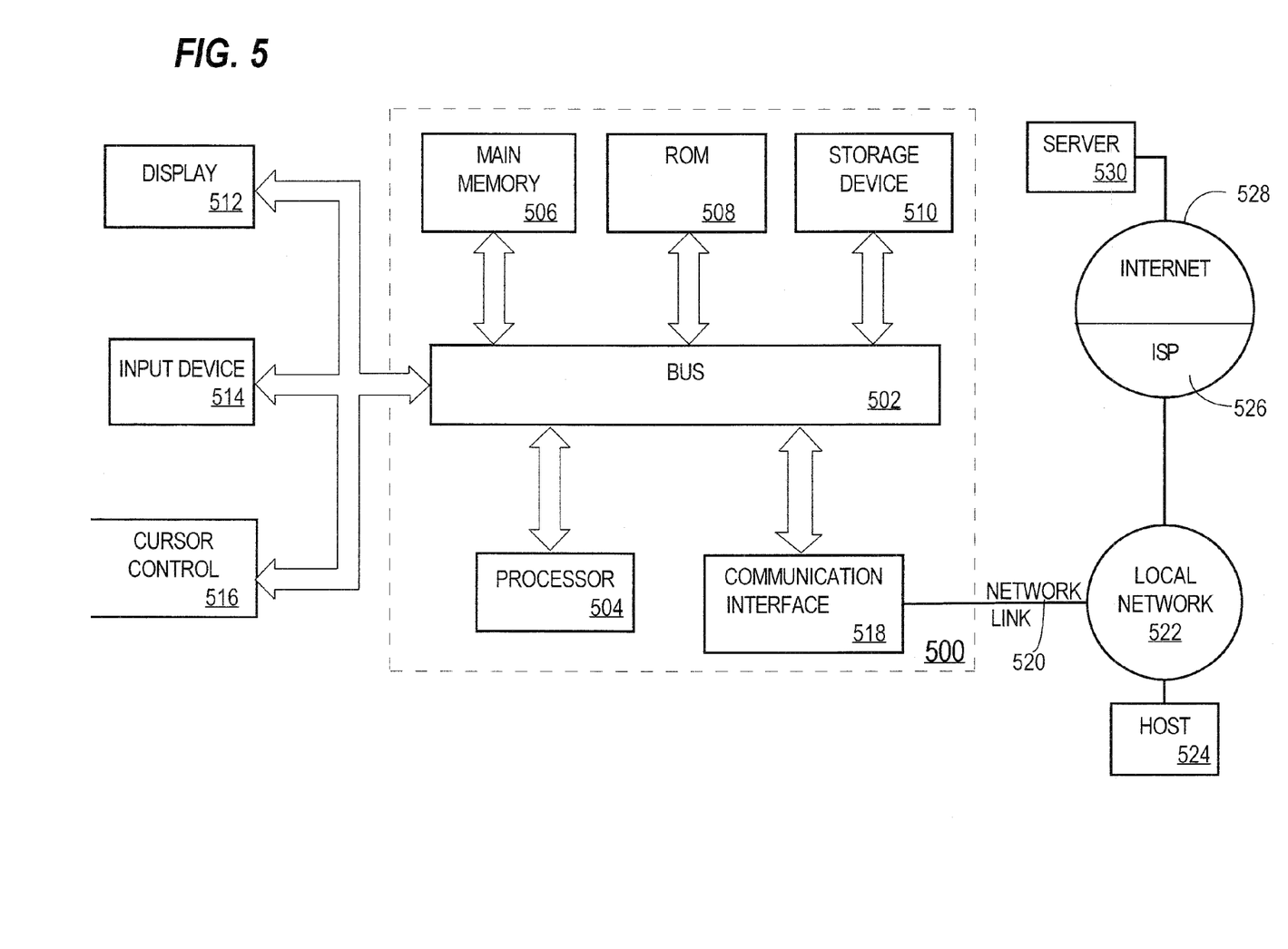
FIG. 5 is a block diagram that illustrates a computer system upon which an embodiment of the invention may be implemented.

The approaches described herein may be implemented on any type of computing platform or architecture. FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network device for processing requests, the network device comprising:
   one or more hardware processors;
   a Web service application (WSA), wherein the WSA includes first logic and is configured to process requests, received from one or more client devices, for a service provided by the WSA;
   one or more extension modules, wherein an extension module of the one or more extension modules comprises second logic;
   an orchestration module, wherein the orchestration module coordinates interactions between the WSA and the one or more extension modules;
   wherein the orchestration module is configured to:
      identify, based on one or more attributes of a request, received from a client device over a network, the extension module to process a portion of the request, cause the extension module to process the portion of the request according to the second logic, and
      after the extension module finishes processing the portion of the request according to the second logic, cause the WSA to process the request according to the first logic.

2. The network device of claim 1, wherein:
   the WSA implements a particular version, of a Web Services specification, that is previous to a current version of the Web Services specification; and
   the second logic corresponds to a difference between the particular version and the current version.

3. The network device of claim 1, wherein:
   the network device further comprises a plurality of WSAs that each provide at least one service; and
   one of the plurality of WSAs includes a print process for processing print data and causing a printed version of an electronic document reflected in the print data to be generated.

4. The network device of claim 1, wherein the WSA is further configured to receive the request and cause the orchestration module to execute.

5. The network device of claim 1, wherein the orchestration module is further configured to receive the request.

6. The network device of claim 1, wherein:
   the orchestration module comprises a plurality of associations;
   each association of the plurality of associations associates one or more fields with one or more modules; and
   the orchestration module being configured to identify the extension module includes the orchestration module being configured to:
      identify a particular field of the request;
      identify, based on the particular field, a particular association of the plurality of associations; and
      identify, based on the particular association, the extension module.

7. The network device of claim 6, wherein:
   the orchestration module being configured to identify the extension module include the orchestration module being configured to identify, based on the one or more attributes of the request, a first module that is different than the extension module; and
   the orchestration module being configured to cause the WSA to process the request includes the orchestration module being configured to identify the first module and cause the first module to process the request.

8. The network device of claim 6, wherein:
   each association of the plurality of associations further associates the one or more fields with one or more contexts;
   a context of the one or more contexts indicates a logical location of each of the one or more fields within a particular request;
   the orchestration module being configured to identify the extension module includes the orchestration module being configured to identify, based on the particular association, one or more particular contexts; and
   the orchestration module being configured to cause the extension module to process includes the orchestration module being configured to cause the extension module to process the portion of the request only if the particular field is within the one or more particular contexts.

9. A network device for processing requests, the network device comprising:
one or more hardware processors;
a Web service application (WSA), wherein the WSA comprises a plurality of modules;
an orchestration module, wherein the orchestration module coordinates an indirect interaction between two or more modules of the plurality of modules;
wherein a first module of the plurality of modules is configured to:
process a request, received from a client device over a network, for a service provided by the WSA; and
cause the orchestration module to execute;
wherein the orchestration module is configured to:
identify, based on one or more attributes of the request, one or more particular modules, wherein the one or more particular modules includes a second module of the plurality of modules to process a portion of the request,
cause the second module to process the portion of the request, and
cause, after the second module finishes processing the portion of the request, the first module to continue processing the request.

10. The network device of claim 9, wherein:
the WSA implements a particular version, of a Web Services specification, that is previous to a current version of the Web Services specification;
the indirect interaction between the first module and the second module constitutes a difference between the current version and the particular version.

11. The network device of claim 9, wherein:
network device further comprises a plurality of WSAs that each provide at least one service; and
one of the plurality of WSAs includes a print process for processing print data and causing a printed version of an electronic document reflected in the print data to be generated.

12. The network device of claim 9, wherein the WSA is further configured to receive the request and cause the orchestration module to execute.

13. The network device of claim 9, wherein the orchestration module is further configured to receive the request.

14. The network device of claim 9, wherein:
the orchestration module comprises a plurality of associations;
each association of the plurality of associations associates one or more fields with one or more modules; and
the orchestration module being configured to identify the second module includes the orchestration module being configured to:
identify a particular field of the request;
identify, based on the particular field, a particular association of the plurality of associations; and
identify, based on the particular association, one or more particular modules, wherein the one or more particular modules includes the second module.

15. The network device of claim 14, wherein:
the one or more particular modules includes a third module that is different than the first module and the second module; and
the orchestration module is configured to cause the first module to further process the request first includes the orchestration module is configured to identify the third module and causing the third module to process the request.

16. The network device of claim 14, wherein:
each association of the plurality of associations further associates the one or more fields with one or more contexts;
a context of the one or more contexts indicates a logical location of each of the one or more fields within a particular request;
the orchestration module being configured to identify an second module includes the orchestration module being configured to identify, based on the particular association, one or more particular contexts; and
the orchestration module being configured to cause the second module to process includes the orchestration module being configured to cause the second module to process the portion of the request only if the particular field is within the one or more particular contexts.

17. A network device for processing requests, the network device comprising:
one or more hardware processors;
a Web service application (WSA), wherein the WSA implements a particular version of a specification; and
a firmware component, wherein the WSA communicates with the firmware component to provide one or more services;
wherein the WSA is configured to:
process a request, received from a client device over a network, for a service provided by the WSA, wherein the request includes a field that is not supported by the particular version of the specification, wherein a value of the field is supported by the firmware component;
translate, based on a mapping, the value into data that the firmware component is able to process; and
wherein the firmware component is configured to process the request based on the data.

18. The network device of claim 17, wherein the particular version is one of (1) a current version of the specification or (2) a previous version of the current version.

19. The network device of claim 18, wherein:
the particular version is a previous version of the current version; and
the field is not supported by the current version.

20. The network device of claim 17, wherein:
the network device further comprises a plurality of WSAs that each provide at least one service; and
one of the plurality of WSAs includes a print process for processing print data and causing a printed version of an electronic document reflected in the print data to be generated.

21. The network device of claim 17, wherein the specification is a Web Services specification.

* * * * *